Sept. 12, 1967 K. B. ARNOLD 3,341,673
AIR SWITCH IN WHICH A FLEXIBLE DIAPHRAGM OPERATES A DUMP
VALVE IN RESPONSE TO PRESSURE CHANGES
Filed March 16, 1966 3 Sheets-Sheet 1

INVENTOR
KENT B. ARNOLD

BY Ross W. Campbell

ATTORNEY

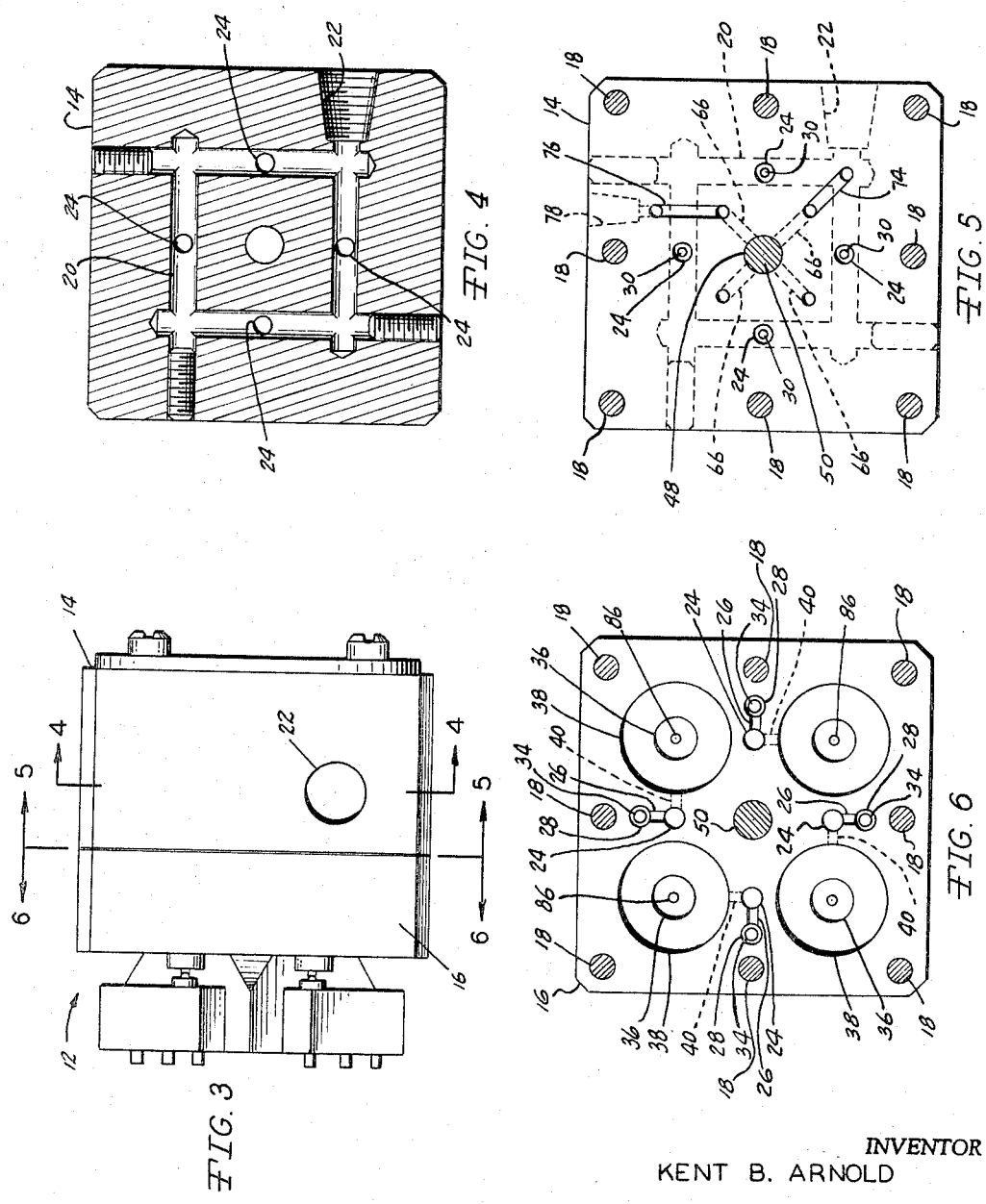

Sept. 12, 1967 K. B. ARNOLD 3,341,673
AIR SWITCH IN WHICH A FLEXIBLE DIAPHRAGM OPERATES A DUMP
VALVE IN RESPONSE TO PRESSURE CHANGES
Filed March 16, 1966 3 Sheets-Sheet 3
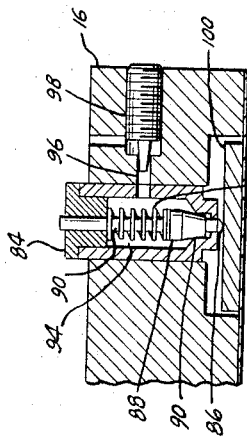
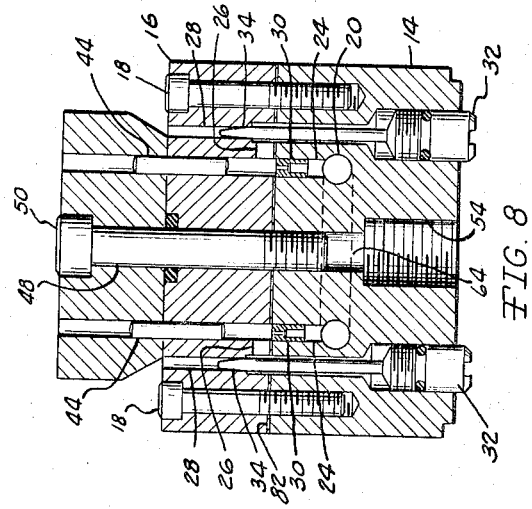
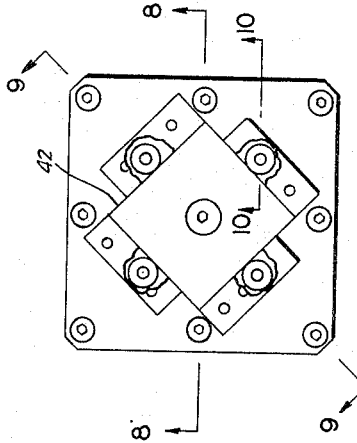
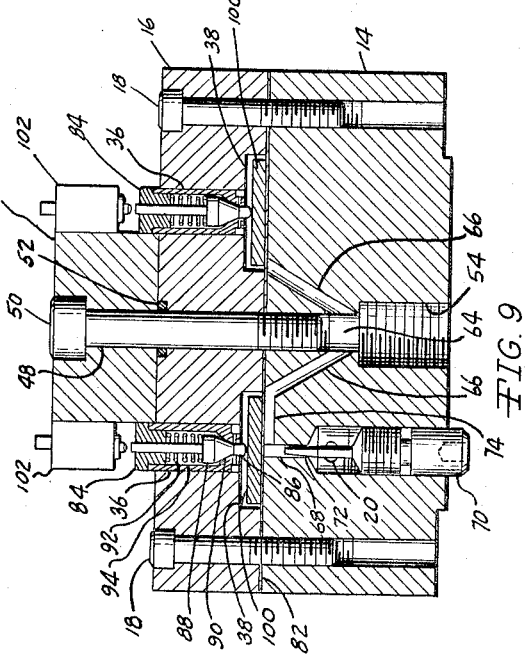
INVENTOR
KENT B. ARNOLD
BY
ATTORNEY United States Patent Office 3,341,673
Patented Sept. 12, 1967

3,341,673
AIR SWITCH IN WHICH A FLEXIBLE DIAPHRAGM
OPERATES A DUMP VALVE IN RESPONSE TO
PRESSURE CHANGES
Kent B. Arnold, 3321 E. Court St.,
Flint, Mich. 48506
Filed Mar. 16, 1966, Ser. No. 541,442
7 Claims. (Cl. 200—83)

ABSTRACT OF THE DISCLOSURE

An air switch including a housing within which a supply of air furnished thereto at constant pressure is divided into two separate systems. One of said systems constitutes a reference pressure system and includes a reference chamber maintained at a constant, preselected pressure. The other system constitutes a gaging pressure system, the pressure within which is modified by a transducer which translates mechanical movement into air pressure changes. A flexible diaphragm separates the two pressure systems and is arranged to impart movement to a disk contained within the reference chamber when the air pressure within the gaging pressure system exceeds the pressure within the reference pressure system. The disk is arranged, when actuated, to open a dump valve which exhausts air rapidly from the reference chamber and substantially reduces the pressure therein, whereby the continued higher pressure of the gaging pressure system maintained the dump valve in open position until the pressure within the gaging pressure system is subsequently reduced sufficiently to permit closure of the dump valve. Control means, such as an electric switch, is actuated by the dump valve as the valve is opened, and causes an appropriate signal to be transmitted by the device. Two or more chambers, disks, dump valves, and control means combinations may be utilized, and by maintaining at separate levels by metering valves the reference air pressure within the several chambers, the several combinations can be arranged to produce serially a plurality of signals. Metering means is provided for metering the air exhausted by each dump valve, whereby the device may be adjusted so as to cause all of the dump valve to be closed automatically, and the device to be thus re-set, when the pressure within the gaging air system is reduced to a pre-selected amount by appropriate movement of the transducer.

---

The present invention relates to air switches and more particularly to a switch employing two opposing air systems separated by a diaphragm and arranged to actuate a dump valve and, in turn, control means.

An object of the present invention is to provide an improved air switch.

Another object of the invention is to provide in an air switch means for positively preventing oscillation in the control signed output thereof.

Another object of the invention is to provide in an air switch a snap-action, dump type valve to actuate control means and to releasably maintain said control means in an actuated state.

A further object of the invention is to provide an air switch employing a single diaphragm to separate a gaging air pressure system from a plurality of reference air pressure chambers and adapted to actuate sequentially a plurality of control means.

Still a further object of the invention is to provide an air switch having only accessible ports, bores and passages and fully exposable channels and chambers contained within a single, otherwise solid housing.

The above and other objects of the invention which will later become apparent as the following description proceeds, are attained by the present invention, a preferred embodiment of which has been illustrated, by way of example only, in the accompanying drawings, forming a part of this specification in which like characters are employed to designate like parts throughout the same, and wherein:

FIGURE 3 is an elevational view of the right or air supply side of an air switch.

FIGURE 4 is a sectional view taken along line 4—4 of FIGURE 3 showing the air supply passages of an air switch.

FIGURE 5 is a rear view of the forward portion of an air switch taken along line 5—5 of FIGURE 3.

FIGURE 6 is a front view of the rear portion of an air switch taken along line 6—6 of FIGURE 3 and showing chambers forming part of the reference air system of the switch.

FIGURE 7 is a rear elevational view of an air switch.

FIGURE 8 is a sectional view of an air switch taken along 8—8 of FIGURE 7.

FIGURE 9 is a sectional view of an air switch taken along lines 9—9 of FIGURE 7.

FIGURE 10 is a sectional view of a part of the rear portion of an air switch taken along line 10—10 of FIGURE 7 and showing a dump valve and metering means therefor.

Figure 1:
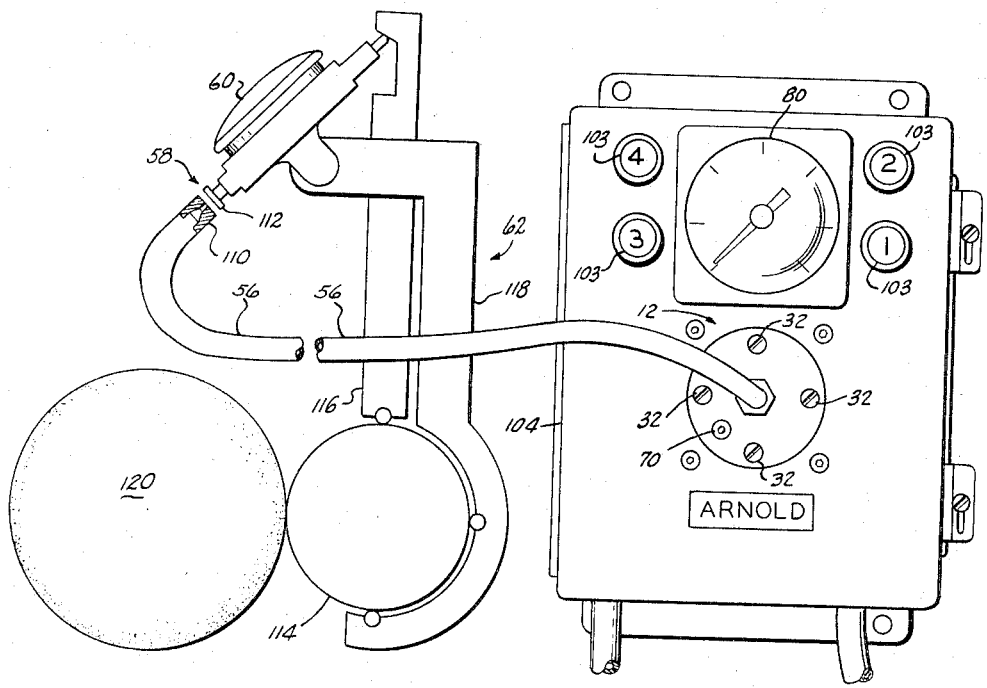
FIGURE 1 is a schematic view of an air switch mounted in a control box and operatively connected to a transducer, dial indicator, and a mechanical grinding gage arranged to gage the diameter of a workpiece being ground upon a grinding machine.
Figure 2:
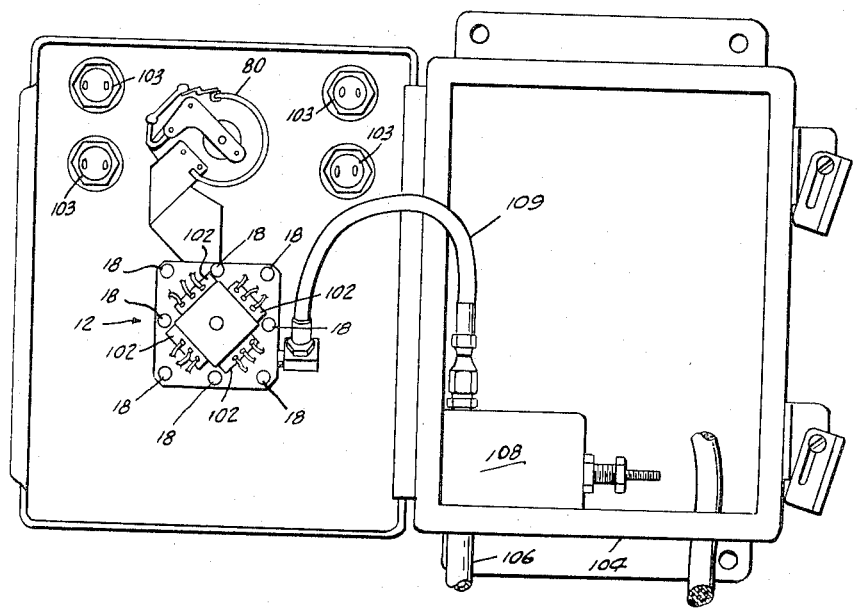
FIGURE 2 is a rear view of an air switch mounted in an opened control box.

My air switch, generally indicated at 12, is preferably formed from a small block of aluminum or other corrosive resistant material, divided, as best shown in FIGURE 3, into a forward portion 14 and a rear portion 16, releasably joined by a plurality of screws 18.

As best shown in FIGURE 4, a rectangular air reservoir 20 is formed by four intersecting bores drilled in forward portion 14 in communication with each other, three of the bores being plugged and one of them being counterbored and tapped to form an air inlet 22 for air at a selected constant pressure.

As best shown in FIGURES 5, 6, and 8, four bores 24 are drilled in forward portion 14 and rear portion 16 normal to and intersecting air reservoir 20, and communicate respectively by four short transverse grooves 26 with four additional bores 28 which extend completely through portions 14 and 16 parallel to bores 24. A metering jet 30, preferably having a diameter of .015 inch, is provided within each bore 24 in lower portion 14. The forward end of each bore 28 is counterbored and threaded to receive a needle valve assembly 32, and a seat 34 is provided for the valve within the bore downstream of transverse groove 26.

As best shown in FIGURES 6 and 9, four bores 36 are drilled in the inner or forward surface of rear portion 16 and counterbored at their forward ends to form four circular reference chambers 38. A short transverse bore 40 is provided within rear portion 16 to communicate each chamber with a bore 24, respectively, downstream of metering jet 30. Air from reservoir 20 will thus pass through metering jet 30 and enter each chamber 38 through bores 24 and 40, the pressure within each chamber being separately regulated by adjustment of the associated needle valve 32, and excess air being vented to the atmosphere through transverse groove 26, valve seat 34, and bore 28. The reference air pressure system is thus formed.

A mounting block 42 is keyed to the rear of rear portion 16 by a pair of dowel pins 44 pressed into bores 24 therein. A central bore 48 is drilled through portions 14 and 16 and mounting block 42, and threaded to receive a screw 50. An O-ring 52 is provided between rear portion 16 and block 42, surrounding screw 50, to prevent leakage of air. A counterbore is drilled and threaded in the forward surface of portion 14 to provide an outlet 54 from which air used for gaging purposes may be communicated by a flexible hose 56 and conventional fittings to a transducer 58, dial indicator 60, and gaging means, such as grinding gage 62, all described in more detail hereinafter.

A space 64 is provided within bore 48 between the rear of outlet 54 and the forward end of screw 50. Four diagonal bores 66 communicate space 64 with the inner or rear surface of forward portion 14 at four points which lie immediately opposite the four chambers 38 when rear portion 16 is joined to the forward portion, as shown in FIGURE 9. As best seen in FIGURE 5, diagonal bores 66 thus lie within planes which are disposed at an angle from the planes within which the lie bores 24 of the reference air system.

A bore 68 is drilled through forward portion 14 normal to and intersecting air supply channel 20 and preferably coaxially with one chamber 38 in rear portion 16, counterbored and threaded to receive a metering valve 70, and provided with a seat 72 for the valve. A groove 74 is formed in the rear surface of forward portion 14 to communicate bore 68 with the diagonal bore 66 closest to valve 70. Air from reservoir 20 upstream of valve 70 thus passes through bore 68, groove 74, the bore 66 communicating therewith, space 64 within central bore 48, through outlet 54 and hose 56 to transducer 58, and through the other three diagonal bores 66 to the rear surface of forward portion 14. A groove 76 and a threaded counterbore 78, shown in FIGURE 5, communicate one diagonal bore 66 with a conventional air pressure indicator 80 upon which the pressure of the gaging air system is visually indicated.

A single rubber-impregnated flexible diaphragm 82 is clamped tightly between the inner surfaces of forward portion 14 and rear portion 16 in a sandwich-like manner when said portions are joined by screws 18. Appropriate apertures are provided in diaphragm 82 to permit bores 24 and 28 to communicate therethrough and for screws 18 and 50 and valves 32 to extend therethrough. Diaphragm 82 thus forms a gasket between portions 14 and 16, and four separate areas thereof, disposed immediately opposite reference chambers 38, respectively, act as separate diaphragms, each separating one reference chamber 38 and the air contained therein from the immediately opposite diagonal bore 66 and the air of the gaging air system contained therein. The gaging air system of any invention is thus formed.

A dump valve 84 is provided within each bore 36 and includes a valve stem 86, a head 88 arranged to seat against a seat 90 opening upon the chamber 38 coaxial with the bore, a spring 92 yieldingly urging the head to seat, and a valve chamber 94 and an exhaust channel 96 through which air may be exhausted from the chamber when the valve head is unseated. A metering valve 98 is provided to regulate the flow of air through exhaust channel 96 of each dump valve 84, respectively, and thereby to maintain a selected residual pressure within each chamber 38 when its dump valve is open.

A lightweight, freely moveable metal or plastic disk 100 is slideably disposed within each chamber 38 between diaphragm 82 and the stem 86 of dump valve 84. Disks 100 prevent rupture of diaphragm 82 by the ends of stems 86 and transmit to the stems force exerted by the diaphragm when the areas of the diaphragm opposite chambers 38 are flexed by gaging air impinging thereon through diagonal bores 66 at a pressure exceeding the reference pressure exerted against the disk and diaphragm by air within the chamber and by spring 92 of the dump valve.

Control means, such as four snap-action electric switches 102 of the microswitch type, are mounted upon mounting block 42 with their actuating plungers axially aligned with and slightly spaced from the stem 86 of each dump valve 84, respectively, and arranged to be contacted and actuated by the stem when the dump valve fully opens, as hereinafter described. Appropriate electric wiring is provided to operatively connect the terminals of microswitches 102 with the control panel of a grinding machine (not shown) in the conventional manner. A pilot light 103 is provided for each microswitch 102, respectively.

To dispose air switch 12 for use, the switch is preferably mounted in the cover of a metal control box 104 with needle valves 32, metering valve 70, and outlet 54 exposed, and with disks 100 residing in a vertical plane, as best shown in FIGURE 1. A supply of pressurized air is furnished through a hose 106 to a conventional pressure regulator 108, and hence through a flexible hose 109 and appropriate conventional fittings to inlet 22 and reservoir 20 of switch 12. Pressure indicator 80 is operatively connected with counterbore 78 and positioned, preferably in the cover of box 104, where it may readily be observed by the operator. Hose 56 is connected to outlet 54 and to a conventional transducer 58 by appropriate conventional fittings. Transducer 58 may be of the Arnold air type which, as shown in FIGURE 1, includes a nozzle 110 which directs air from hose 56 in a jet against an anvil 112 mounted upon a stem of dial indicator 60, but other transducers which translate mechanical movement into changes in air pressure may also be used. Dial indicator 60 is operatively connected with gaging means such as a conventional grinding gage 62 which is arranged to embrace a workpiece 114 and has a plunger 116 arranged to move relative to a frame 118 as the diameter of the workpiece is reduced by grinding. Workpiece 114 is supported, rotated, and arranged to be ground by the grinding wheel 120 of the grinding machine in the usual manner.

Pressure indicator 80 is calibrated to read 10 p.s.i. when the air pressure provided at inlet 22 by pressure regulator 108 is 30 p.s.i. and anvil 112 is withdrawn a sufficient distance from nozzle 110 to permit an unrestricted flow of air from the nozzle. Needle valve 70 is then adjusted so that when hose 56 leading from outlet 54 to transducer 58 is thereafter pinched off, pressure indicator 80 will register at a point previously calibrated as being 30 p.s.i. Under these conditions, pressure indicator 80 will respond linearly over the operative portion of the conventional scale printed thereon.

In operation, with workpiece 114 embraced by grinding gage 62, the grinding operation is commenced in the usual manner. As the grinding wheel 120 removes stock from workpiece 114, plunger 116 moves downward with respect to frame 118 of gage 62 and such movement is transmitted to dial indicator 60. Movement of the stem of dial indicator 60 causes anvil 112 mounted thereon to progressively close the gap between it and nozzle 110, thus progressively restricting the flow of air escaping through the nozzle and correspondingly increasing the air pressure within hose 56 and hence throughout the entire gaging air system including bores 66, channel 74, and against diaphragm 82 immediately opposite each of the four chambers 38. As the air pressure within the gaging air system thus increases, diaphragm 82 is pressed with increased pressure against disks 100 and urges the disks against the stems 86 of the dump valves 84 respectively contacted thereby. Such pressure of the gaging air system against diaphragm 82, disks 100, and valve stems 86 is opposed by the spring 92 of each dump valve 84 and by the reference air pressure within each chamber 38. It will be noted that the reference air pressure within each chamber 38 may be independently adjusted by the needle valve 32 associated therewith.

When the pressure of the gaging air system equals the total reference pressure, i.e. the pressure of spring 92 and the reference air pressure, within that chamber 38 which has been adjusted to have the lowest reference air pressure within it, the opposing forces upon the diaphragm opposite that individual chamber will be equal. Further increase of pressure within the gaging system will then urge diaphragm 82 to flex and disk 100 to press against the stem 86 of dump valve 84 and cause valve head 88 to be unseated from seat 90. When dump valve 84 is thus unseated, the reference air within that reference chamber 38 is exhausted to the atmosphere through channel 96 with almost explosive rapidity. The sudden reduction in pressure within that reference chamber 38 causes diaphragm 82 and disk 100, urged by the continued high pressure of the gaging air system, to move valve stem 86 instantly and fully rearward, compressing spring 92, actuating microswitch 102 by contacting and depressing the actuating plunger thereof, and sending an electric signal to the control panel of the grinding machine. The differential pressure across diaphragm 82 will then maintain dump valve 84 open and microswitch 102 actuated.

By appropriate adjustment of each of the four needle valves 32 each of the corresponding four microswitches 102 can be caused to be actuated at different pressures of the gaging air system, thereby providing separate control signals to be sent to the grinding machine control panel at four separate, progressively increased limits as the workpiece is ground to progressively smaller diameters and the gaging air pressure increases. Preferably the first three signals are arranged to be given and to slow the rate of grinding as the workpiece approaches tolerance, and the last signal is arranged to half the grinding operation by removing grinding wheel 120 rearwardly from the workpiece instantly when the desired final diameter of the workpiece has been attained.

To reset the switch after all four microswitches 102 have been actuated and the grinding cycle is completed, the pressure within the gaging air system is reduced sufficiently to allow springs 92 and the air pressure within each reference chamber 38 to force disks 100 and diaphragm 82 back against the rear surface of forward portion 14 and the head 88 of each dump valve 84 to close against its seat 90, and hence to allow the reference air pressure within each chamber 38 to build up again to its normal level. To facilitate such, metering valve 98 associated with the exhaust channel 96 of each dump valve 84 is adjusted to maintain within the chamber 38 serviced thereby a residual air pressure, remaining after the valve has been actuated, which will maintain the pressure within such chamber at a preselected minimum level above 0 p.s.i. but which will not impede the opening of the valve. The pressure within the gaging air system as a whole thus need not be reduced to an unnecessarily low level in order to reset all of dump valves 84 and microswitches 102, but only to a level below the lowest chamber pressure established by metering valves 96.

Thus switch 12 may be arranged to be reset when pressure within the gaging air system is reduced to a level corresponding to any desired oversized diameter of a workpiece sensed by transducer 58 when the workpiece is introduced to gage 62. For example, metering valves 98 may be adjusted so that all four dump valves 84 will close when a workpiece .002 inch or more oversize is introduced to grinding gage 62 and sensed by transducer 58. Workpiece 114 would then have to be out-of-round, as distinguished from oversized, at least .002 inch before such shape would cause oscillation and repeated actuation of any dump valve 84 and its microswitch 102. Since in practice most workpieces are at least .005 inch oversize before being ground, all four dump valves 84 and microswitches 102 of switch 12 would be automatically reset when such a workpiece was introduced to grinding gage 62, and fluctuation of the electrical switch from "on" to "off" and back again by workpieces out-of-round less than .002 inch would be absolutely prevented by the dump valves.

Conventional air-electric switches do not employ dump valve means to actuate an electric switch, and the diaphragm intermediate the gaging air pressure systems and the reference air pressure systems thereof are not urged against the electric switch of such devices with sufficient force to actuate the switch; consequently all such conventional devices must utilize other means, such as a second diaphragm, to secure and transmit sufficient force to actuate the electric switch. Since valve stem 86 of the present invention is spaced slightly from the actuating plunger of microswitch 102, diaphragm 82 is completely unloaded, except for the effect of disc 100 and spring 92 of dump valve 84. The gap between the microswitch actuating plunger and the dump valve stem isolates the dump valve, and hence disc 100 and diaphragm 82, from the pressure of the microswitch actuating plunger and from inertia, friction, and variable resistances associated therewith, until after the dump valve has been opened by the diaphragm. At the critical instant when the device is to be actuated during the first or "trip" phase of operation, the diaphragm thus responds with the utmost sensitivity and causes valve 84 to be opened.

The single diaphragm of the present invention, however, is also thereafter employed in the second or power phase of operation of the switch, without the slightest diminution of the great sensitivity utilized in the first or "trip" phase, as the opening of the dump valve causes a rapid decrease in the pressure of the gaging air system, flexes still further to cause the dump valve stem to contact and actuate the microswitch. Full sensitivity to differential pressure across the diaphragm is thus obtained for accurate gaging, together with full force upon the electric switch in response thereto. A dual result is thus obtained with employment of a single diaphragm, a result which has never before been achieved in the art. And the force developed by reduction of pressure within reference chamber 38 is sufficient to operate even a small air or hydraulic valve.

My air electric switch does not employ the numerous springs, pistons, plurality of diaphragms, and number of other elements which burden other air electric switches and which introduce friction and inertia into the operation thereof at the very time when maximum sensitivity is of greatest importance. The single diaphragm is freely supported and no heavy elements are secured to the flexible portions thereof. The switch is thus not only of more simple and rugged construction but also more sensitive and accurate in operation.

It will be noted that no external piping, connections, or hoses are required for my improved air switch, other than hoses 56 and 110 for air output and input, that all ports, bores and passages are accessable, that all channels and chambers are fully exposable, that the sandwich construction of the switch facilitates replacement of diaphragm 82, and that the switch is contained within a single, otherwise solid housing when portions 14 and 16 are united by screws 18. The switch is thus able to be easily cleaned and maintained. It will also be particularly noted that a single, easily replaced diaphragm members serves as four separate diaphragms for four separate limits of the switch. If desired, fewer or additional limits may be similarly provided, still utilizing only a single diaphragm member.

While for purpose of illustration I have shown and described my invention in operative association with a grinding machine, it may, of course, be used to control other machines and devices where mechanical movement may be translated into air pressure changes by a transducer, and other control means than electric switches 102 may be employed therewith.

It is to be understood that the form of the invention herewith shown and described is to be taken as a preferred

What is claimed is:

1. In an air switch including a housing, a chamber within said housing, a flexible diaphragm sealed within said housing and forming a surface of said chamber, a reference pressure system for supplying air to said chamber at a reference pressure, a gaging pressure system for supplying air against the surface of said diaphragm opposite from said chamber at a minimum pressure of less than said reference pressure, and means for varying the pressure within said gaging pressure system in response to external stimuli and to cause flexure of said diaphragm when said pressure within said gaging pressure system exceeds said reference pressure, means for increasing the differential pressure across said diaphragm and rapidly amplifying the force of said flexure to actuate control means, comprising, a valve disposed to be opened by flexure of said diaphragm and arranged to rapidly exhaust air from said chamber.

2. An air switch comprising;
a housing,
a chamber within said housing,
a flexible diaphragm sealed within said housing and forming a surface of said chamber,
a reference pressure system for supplying air to said chamber at a reference pressure,
a gaging pressure system for supplying air against the surface of said diaphragm opposite from said chamber at a minimum pressure of less than said reference pressure,
means for varying the pressure within said gaging pressure system in response to external stimuli,
a dump valve arranged to be actuated by flexure of said diaphragm when pressure within said gaging pressure system exceeds pressure within said reference pressure system and, when actuated, rapidly to exhaust air from said reference chamber to reduce the pressure therein,
and control means arranged to be actuated when the pressure within said reference chamber is reduced.

3. The device of claim 2 having means for adjusting the reference air pressure within said chamber.

4. The device of claim 2 having means for maintaining a preselected residual pressure within said chamber when said dump valve has been actuated.

5. The device of claim 2 having lightweight, freely moveable means within said chamber for transmitting to said dump valve pressure from said diaphragm when said diaphragm is flexed.

6. An air switch comprising;
a housing,
a plurality of chambers within said housing,
a single, flexible diaphragm sealed within said housing and forming a surface of each said chamber,
a reference pressure system for supplying air to each said chamber at a reference pressure,
a gaging pressure system for supplying air against portions of the surface of said diaphragm opposite from each said chamber at a minimum gaging pressure of less than said reference pressure,
a transducer operatively associated with said gaging pressure system, arranged to vary the pressure within said gaging pressure system in response to movement of gaging means, and including an anvil arranged to be moved by a plunger of said gaging means relative to a frame of said gaging means,
a dump valve operatively associated with each said chamber, respectively, arranged to be actuated by flexure of the portion of said diaphragm forming a surface of such chamber when pressure within said gaging pressure system exceeds pressure within such chamber and, when actuated, rapidly to exhaust air from such chamber and to reduce the pressure therein,
control means associated with each said chamber, respectively, and arranged to be actuated when the pressure within such chamber is reduced,
and means for adjusting the reference pressure within said chambers, respectively, to cause said control means associated therewith to be actuated at preselected separate limits.

7. An air switch comprising;
a housing including a releasably joinable forward portion and rear portion,
an air reservoir formed in said forward portion and having an air inlet for a supply of air at constant pressure,
at least two chambers formed in the inner surface of said rear portion,
a flexible diaphragm clamped between said forward and rear portions and forming a surface of each said chamber,
first bore means in said housing extending through said diaphragm and communicating said reservoir with each of said chambers,
a metering jet in said first bore means,
second bore means arranged to communicate each chamber separately with the atmosphere,
third bore means communicating said reservoir with an outlet and with portions of the surface of said diaphragm opposite from each said chamber,
a metering valve in said third bore means downstream of said reservoir and upstream of said outlet and diaphragm,
a dump valve associated with each chamber, having a valve stem extending axially into such chamber, and arranged to exhaust air from and reduce pressure within such chamber when actuated,
a lightweight disk freely disposed within each chamber and arranged to transmit movement of said diaphragm to said valve stem to actuate said dump valve when pressure on the surface of said diaphragm opposite such chamber exceeds pressure within such chamber, respectively,
a snap-action electric switch associated with each said dump valve, respectively, and arranged to be actuated thereby when the pressure within such chamber is reduced,
a transducer operatively connected to said outlet and arranged to vary the pressure within said third bore means downstream of said metering valve in response to movement of a mechanical grinding gage,
a needle valve operatively associated with each said second bore means, respectively, to control separately the pressure within each chamber prior to actuation of the associated dump valve, and to cause said electric switches to be actuated at preselected separate limits,
and a metering valve associated with each dump valve, respectively, and arranged to maintain a preselected residual pressure within the associated chamber when said dump valve has been actuated.

References Cited

UNITED STATES PATENTS

| | | | |
|---|---|---|---|
| 2,249,904 | 7/1941 | Lewis | 33—147 |
| 2,567,360 | 9/1951 | Balziger | 73—37.6 |
| 2,585,533 | 2/1952 | Bryant et al. | 73—37.6 X |
| 2,618,288 | 11/1952 | Catheron. | |
| 2,729,968 | 1/1956 | Segerstad et al. | 73—37.6 |
| 2,795,855 | 6/1957 | Worthen | 73—37.5 |
| 3,140,368 | 7/1964 | Young et al. | 200—83 |

BERNARD A. GILHEANY, *Primary Examiner.*

H. B. GILSON, *Assistant Examiner.*